(12) United States Patent
Kim et al.

(10) Patent No.: US 8,534,405 B2
(45) Date of Patent: Sep. 17, 2013

(54) CARGO SCOOTER WITH THE ABILITY TO LEAN

(75) Inventors: John Kim, Irvine, CA (US); Dave Zermeno, Santa Ana, CA (US); Andrew Naminga, Santa Ana, CA (US)

(73) Assignee: DioMede Equity LLC, Cupertino, CA (US)

( * ) Notice: Subject to any disclaimer, the term of this patent is extended or adjusted under 35 U.S.C. 154(b) by 66 days.

(21) Appl. No.: 13/252,789

(22) Filed: Oct. 4, 2011

(65) Prior Publication Data
US 2013/0020142 A1 Jan. 24, 2013

Related U.S. Application Data

(60) Provisional application No. 61/510,222, filed on Jul. 21, 2011.

(51) Int. Cl.
*B62K 7/04* (2006.01)

(52) U.S. Cl.
USPC .............. 180/205.1; 280/87.041; 280/87.05

(58) Field of Classification Search
USPC .............. 280/87.01, 87.021, 87.041, 87.042, 280/87.05; 180/205.1
See application file for complete search history.

(56) References Cited

U.S. PATENT DOCUMENTS

| | | | | |
|---|---|---|---|---|
| 4,958,843 | A | * | 9/1990 | Cole ............................. 280/30 |
| 5,092,616 | A | * | 3/1992 | McKinney ............... 280/87.043 |
| 5,957,482 | A | * | 9/1999 | Shorter ......................... 280/639 |
| 6,186,524 | B1 | * | 2/2001 | McQueeny et al. ...... 280/87.021 |
| 7,407,032 | B1 | * | 8/2008 | Chambers et al. ............ 180/312 |

* cited by examiner

*Primary Examiner* — Tony H. Winner
*Assistant Examiner* — Jacob Knutson
(74) *Attorney, Agent, or Firm* — The Law Office of Austin Bonderer, PC; Austin Bonderer

(57) ABSTRACT

A cargo scooter is described having at least one front riding wheel, at least one rear riding wheel, a deck, and a cargo box. The cargo box has a floor that is located between the steering column and the at least one riding wheel. All of the riding wheels are aligned with each other.

24 Claims, 21 Drawing Sheets

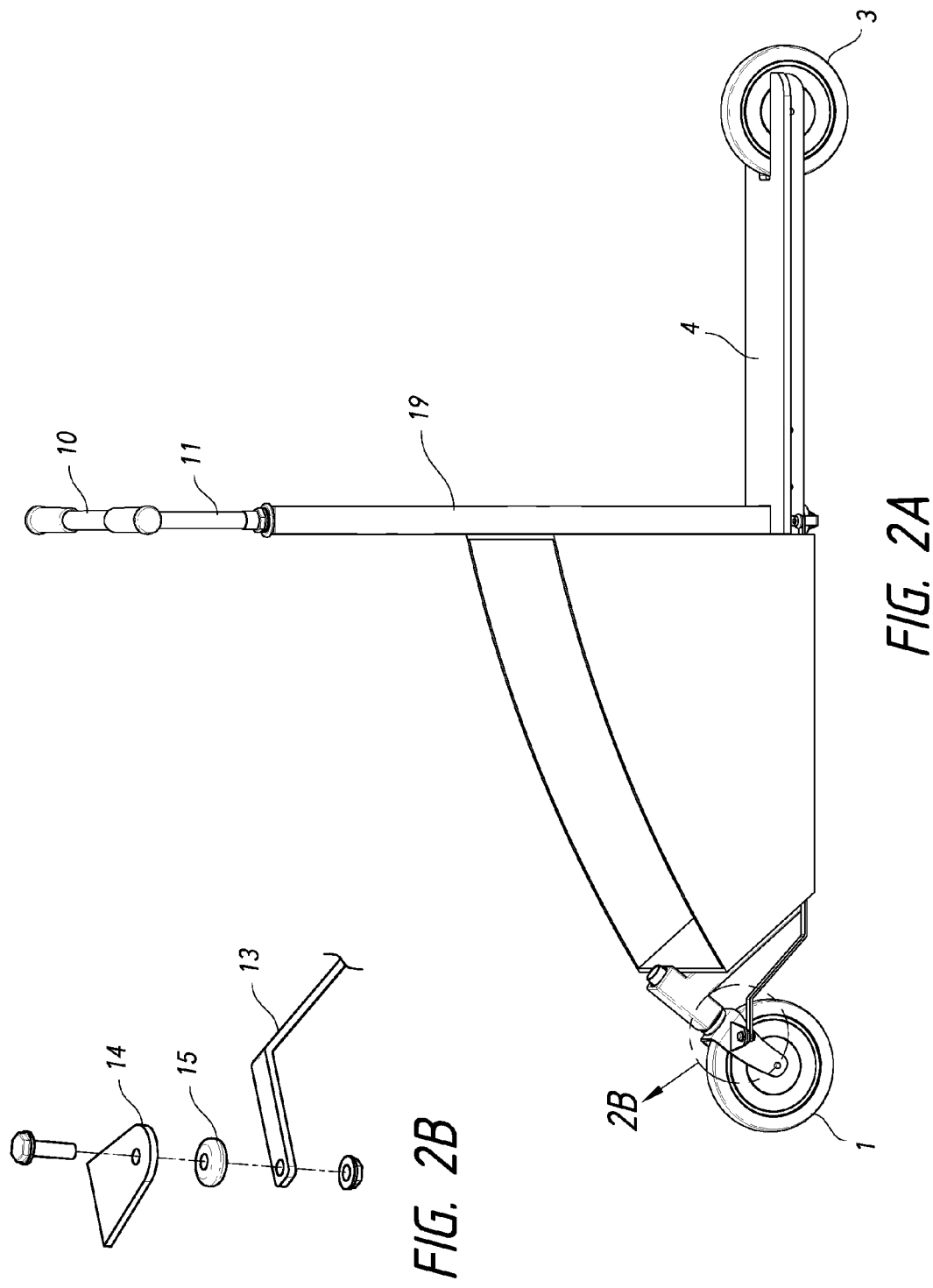

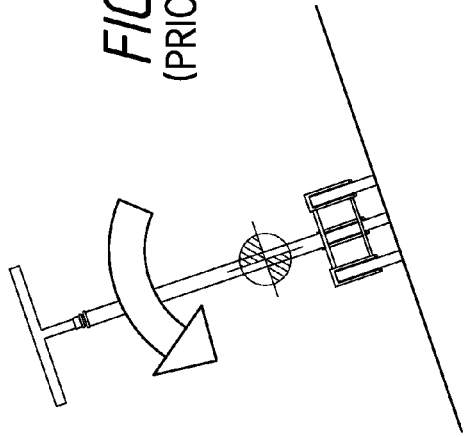
*FIG. 3A*
(PRIOR ART)
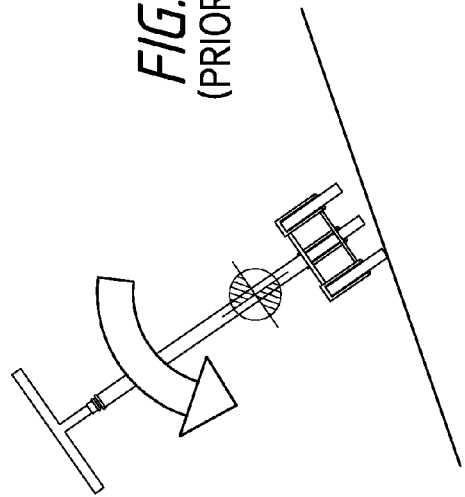
*FIG. 3C*
(PRIOR ART)
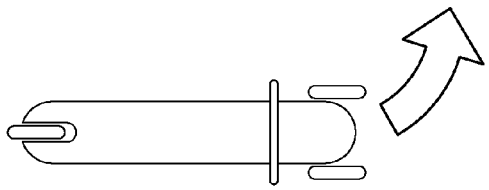
*FIG. 3B* TURNING AT SPEED TIP-PRONE
(PRIOR ART)
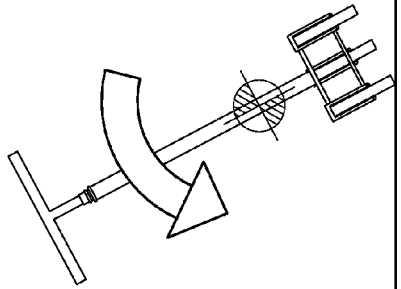
*FIG. 3D*
(PRIOR ART)
UNLEVELED SURFACE TIP-PRONE

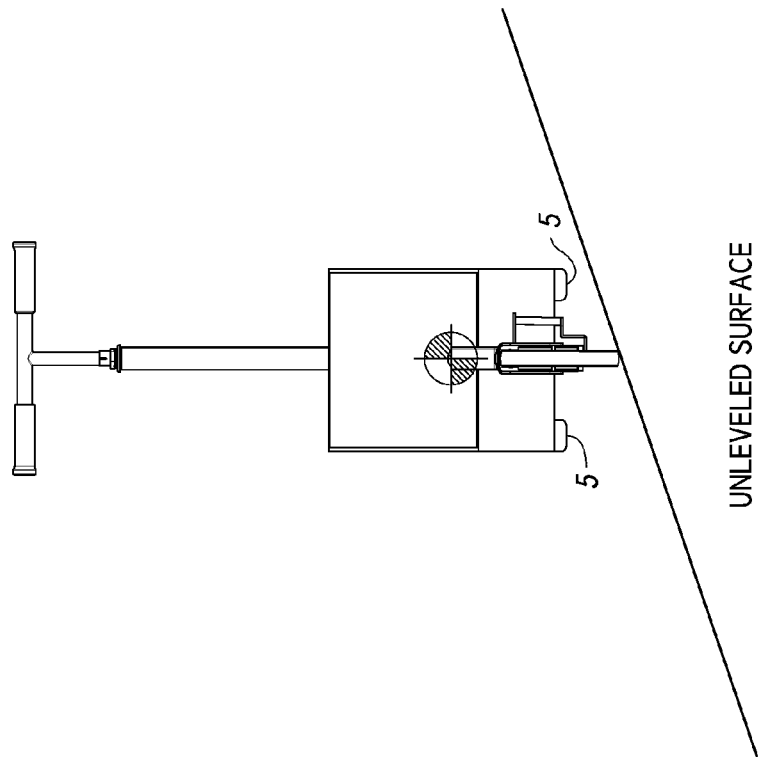
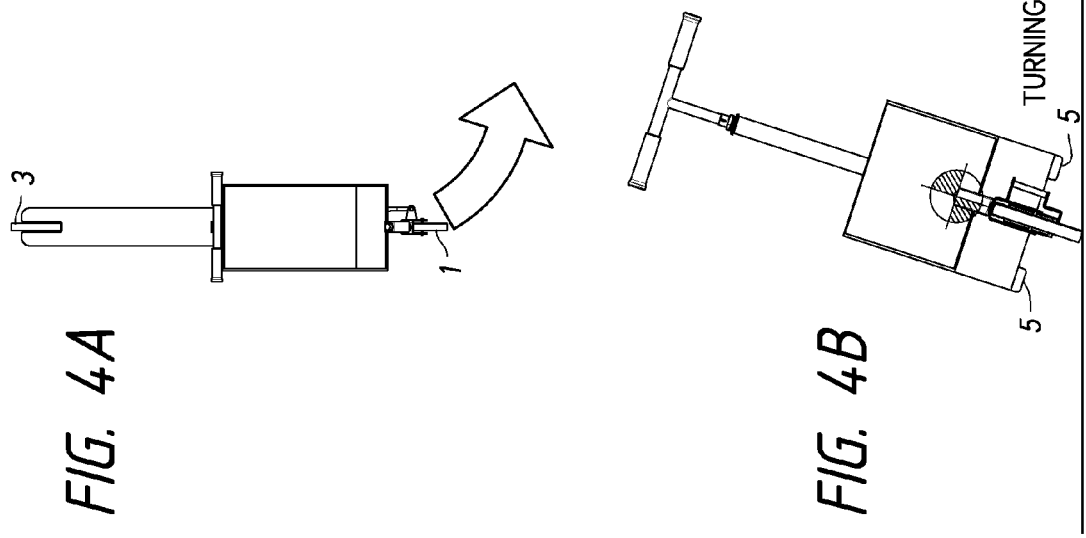

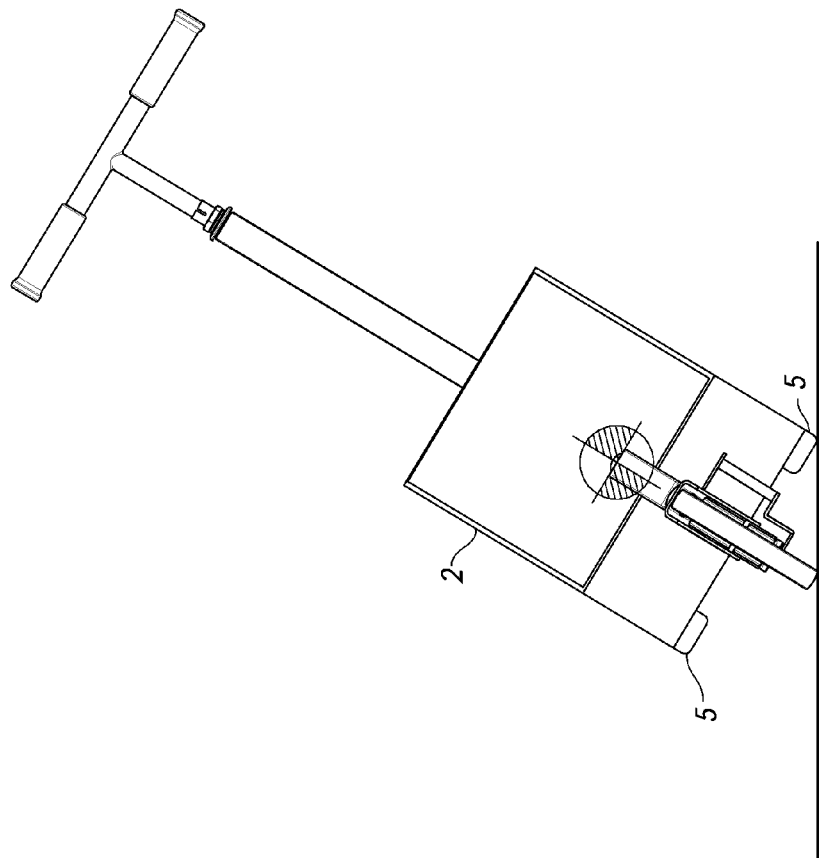
FIG. 5B LEAN PARKING
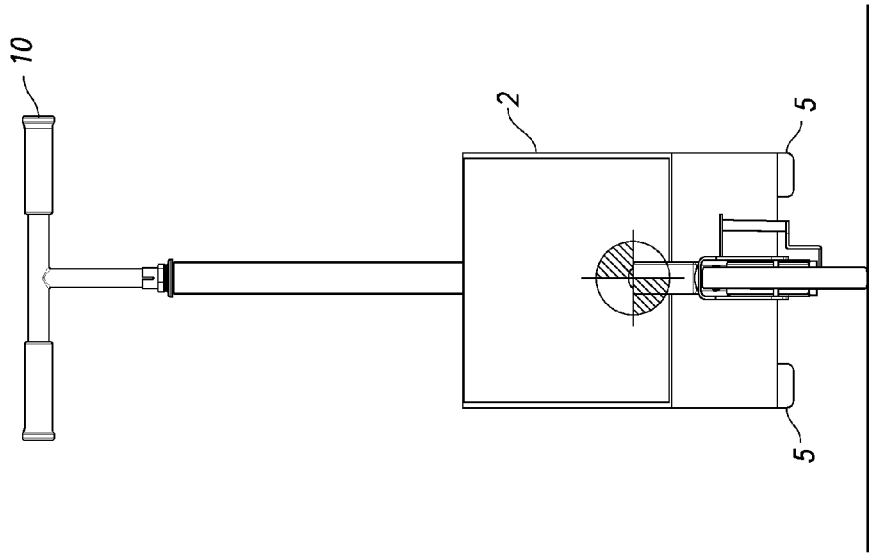
FIG. 5A RIDING

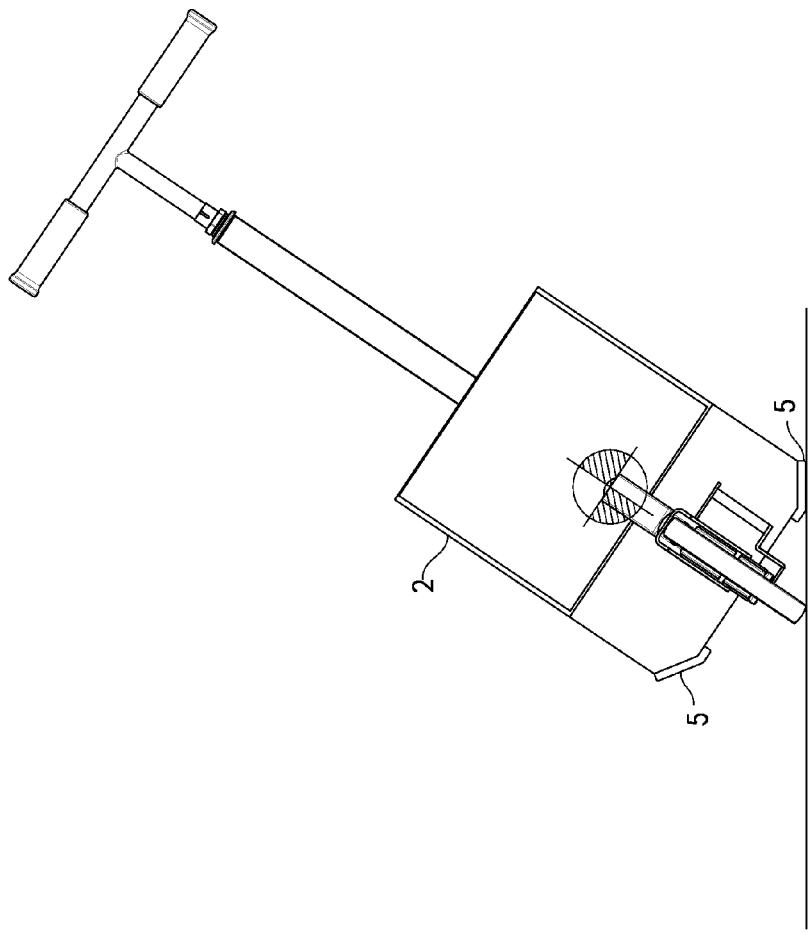
FIG. 5D LEAN PARKING
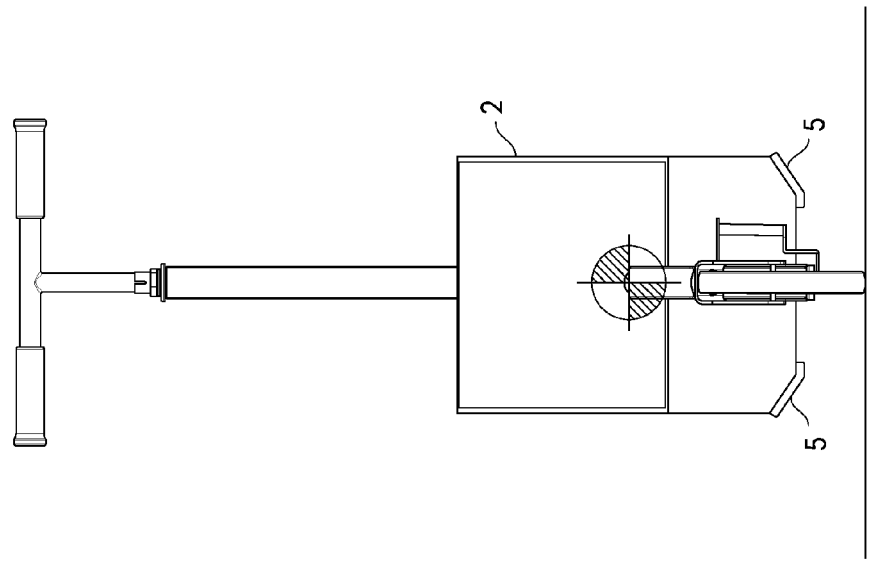
FIG. 5C RIDING

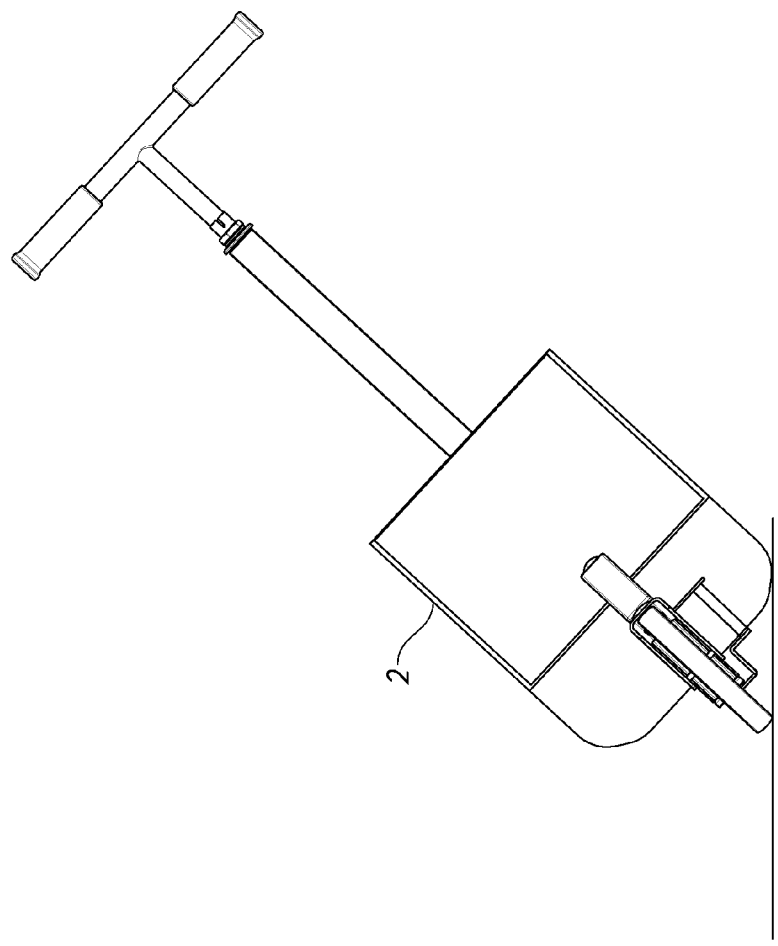
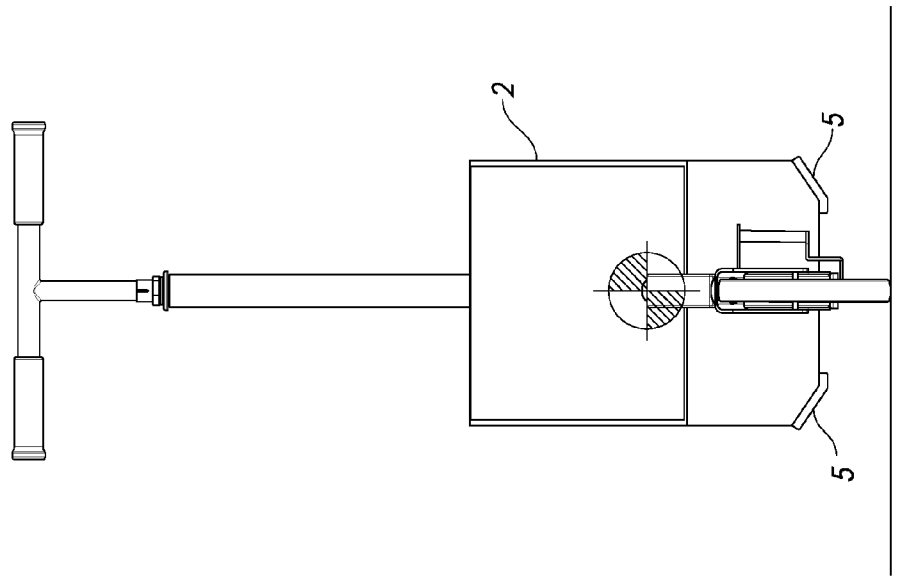
FIG. 5E  RIDING
FIG. 5F  LEAN PARKING

FIG. 12A
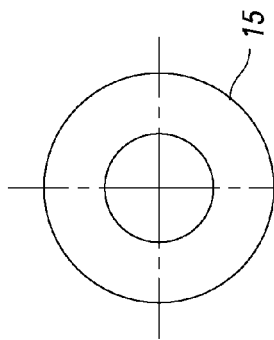
UNCOMPRESSED BUSHING
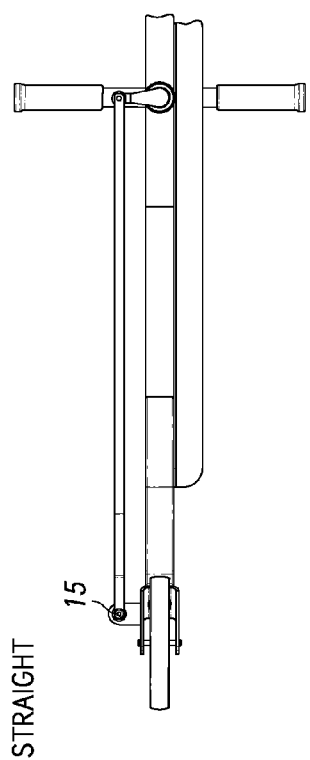
STRAIGHT
FIG. 12B
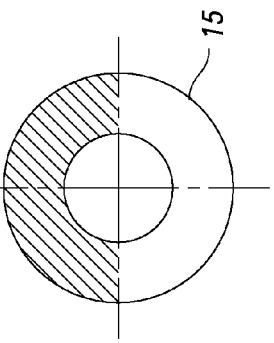
COMPRESSED BUSHING ON LEFT TURN
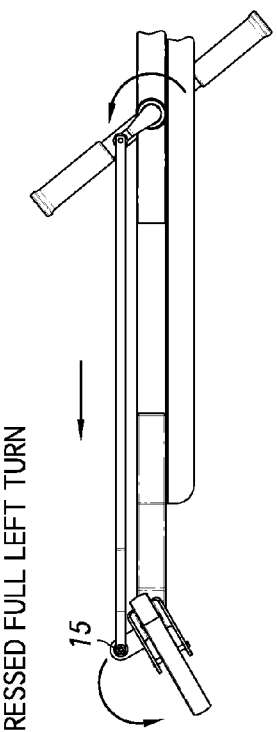
COMPRESSED FULL LEFT TURN
FIG. 12C
COMPRESSED BUSHING ON RIGHT TURN
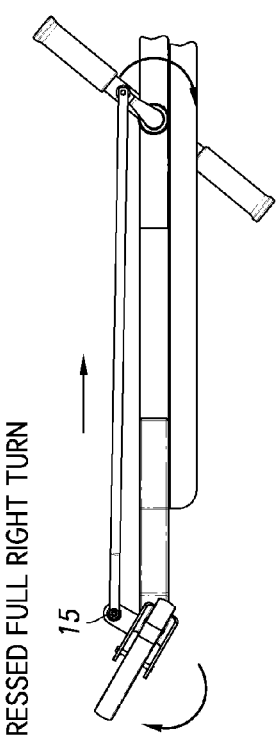
COMPRESSED FULL RIGHT TURN

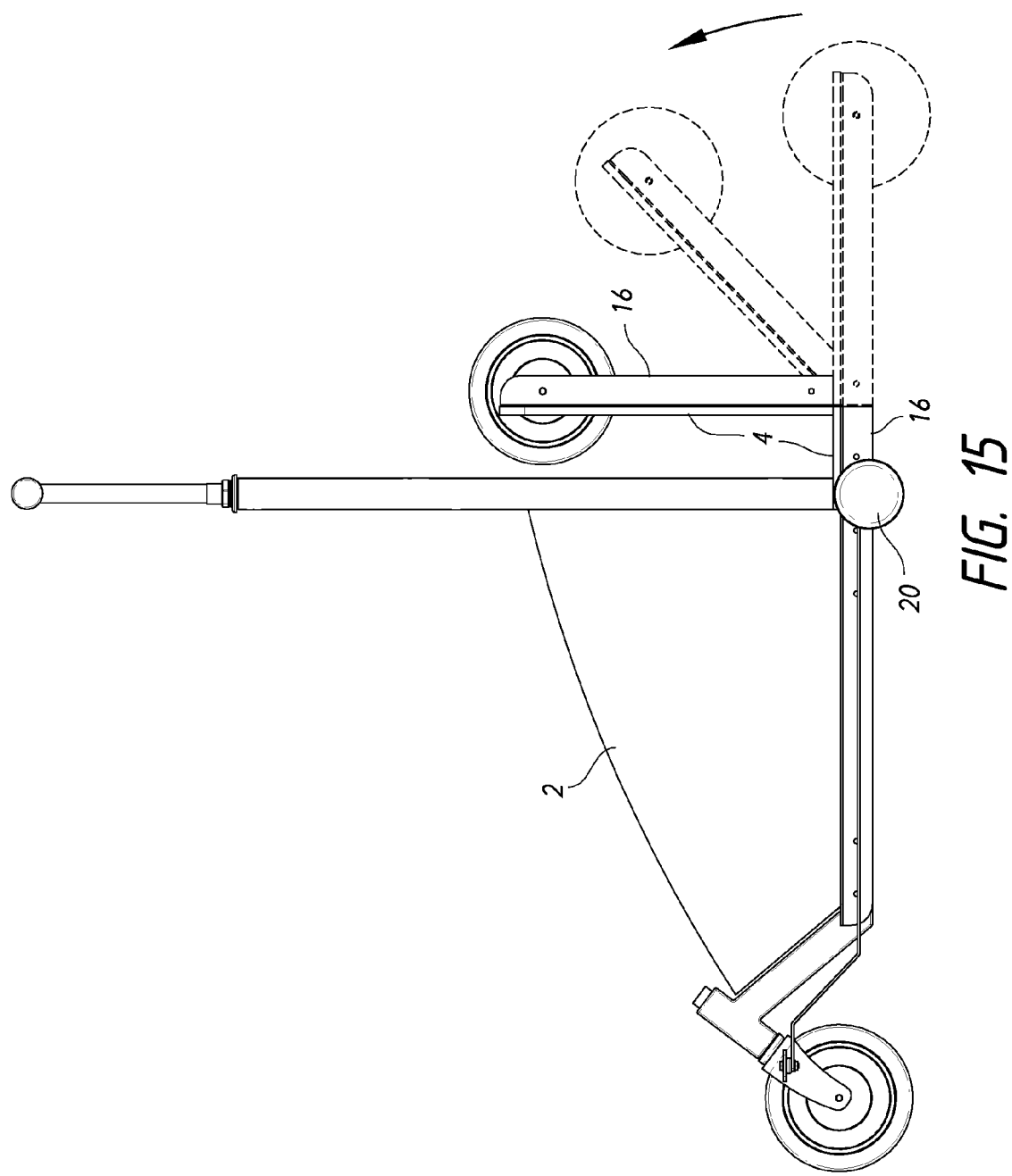

CARGO SCOOTER WITH THE ABILITY TO LEAN

RELATED CASES

The current application claims benefit of, and incorporates by reference, U.S. provisional application 61/510,222, filed on Jun. 21, 2011 under 35 U.S.C. §119(e).

FIELD OF THE INVENTION

Automobiles and mass transportation such as buses and trains are often not the most efficient forms of transportation for short distance trips of one kilometer or less. For these "neighborhood trips", the costs for fuel, vehicle maintenance, road construction, noise & air pollution, traffic, and parking outweigh the utility that cars and buses provide. Furthermore, intermittent schedules and long wait times make mass transportation impractical for most neighborhood trips. Also due to urban sprawl, walking distances in many cities are too far apart to make walking while carrying a load practical for many busy people. Additionally, in a warehouse environment, great distances must be traversed with products in tow.

Although there are other push/pull style products such as handcarts, wagons, and dollies that are designed to fill the local cargo transportation niche, most are designed with three or four riding wheels for stable riding on flat level surfaces. However, these products are not designed to lean. Therefore, they become highly unstable and tip prone when turning at moderate speeds or when riding on angled unlevel surfaces.

Therefore there is a need in the art for a convenient, fast, and energy efficient means of transporting people and goods.

SUMMARY OF THE INVENTION

The scooter is designed to fill the gap between trips that users feel are too far for walking and too short for powered vehicles like buses and automobiles. It is specifically designed to carry cargo so that users can conveniently transport items such as groceries, young children, takeout food deliveries, warehouse items, etc. At the same time through its simple cargo focused design, the scooter offers more utility for local transportation needs at far less cost with less maintenance than existing bicycles, tricycles, and kick scooters.

The scooter is unique when compared to those competing products in that the scooter is designed with riding wheels arrange substantially along the same line so that it can lean into turns, lean when riding on angled unlevel surfaces (relative to the angled unlevel surface), and lean when parked. By being able to lean, the scooter is more stable when riding at higher speeds and less tip prone then competing products that do not lean.

Furthermore, the scooter has a unique dampened linked steering system that allows the user to steer from the back of the scooter while maintaining high-speed stability with minimal steering vibration. Overall, the linked steering system is designed to dampen steering vibration and provide progressive steering resistance to the users as they ride, resulting in a safer more stable ride. At the same time, it allows the user to steer from behind the cargo, giving the foot clearance and the ability to monitor the load.

The invention is a push powered scooter that can be used to transport cargo, pets, and passengers. Similar to bicycles, tricycles, and kick scooters, the invention is used for local transportation. However rather than having a general purpose design like a bicycle that is then modified to carry cargo, the scooters are specifically designed to make it easy to carry cargo, passengers, or pets for short distance trips. The scooter can fill the gap between trips that are too far for walking and too short for powered vehicles like buses and automobiles. Also, the scooter is designed for simplicity, low maintenance, and low initial cost.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIGS. 2A-2C: shows an embodiment of a linkage arm system;
FIGS. 3A-3D: demonstrate stability issues of the Prior Art;
FIGS. 4A-4C: shows the stability of an embodiment of a scooter;
FIGS. 5A-5F: show different embodiments of a scooter;
FIGS. 12A-12C: shows effects of different steering states on a bushing;
FIG. 15: shows an embodiment of the scooter that is foldable.

DETAILED DESCRIPTION

Figure 1:
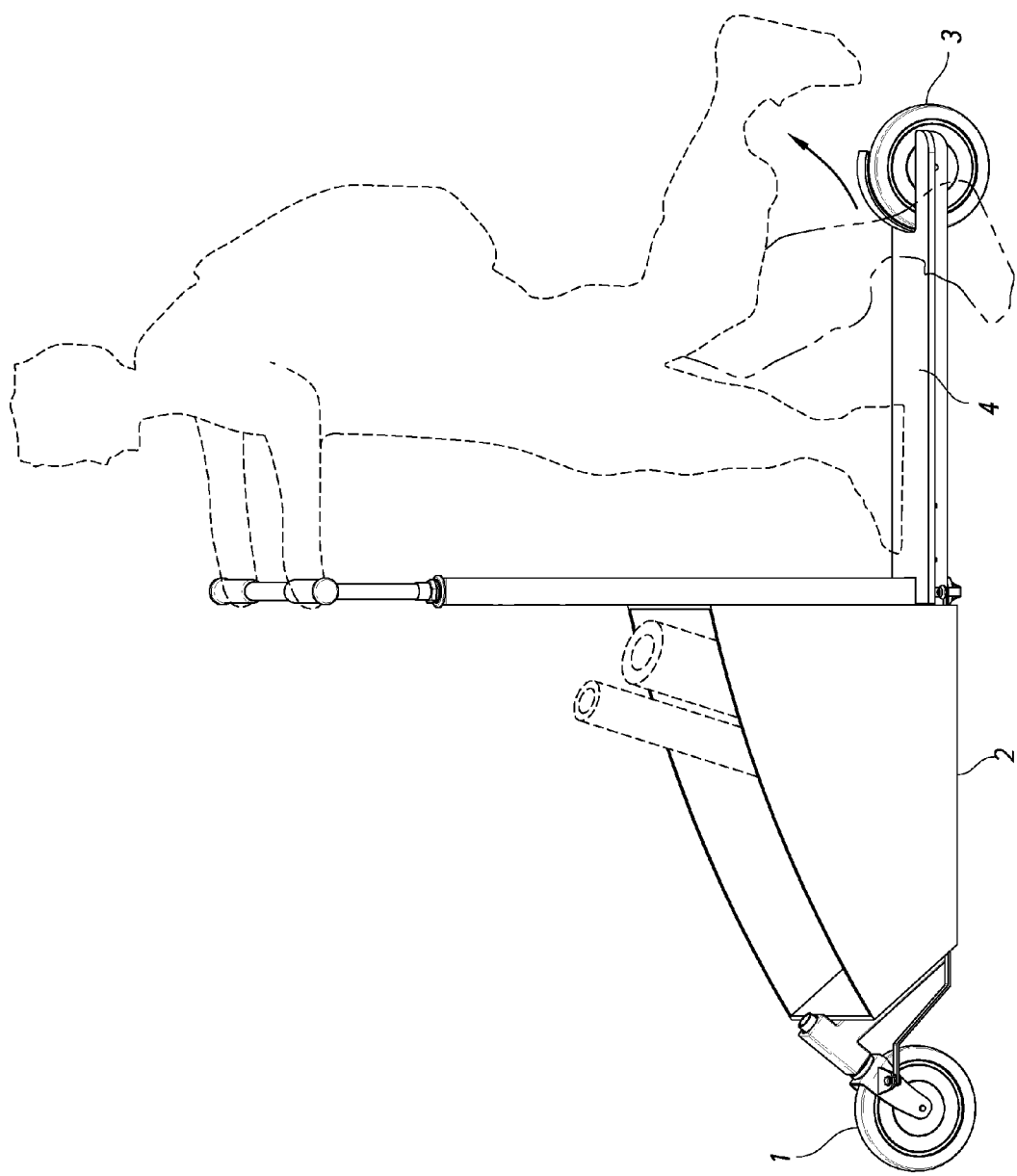
FIG. 1: shows an embodiment of a scooter.
Figure 2C:
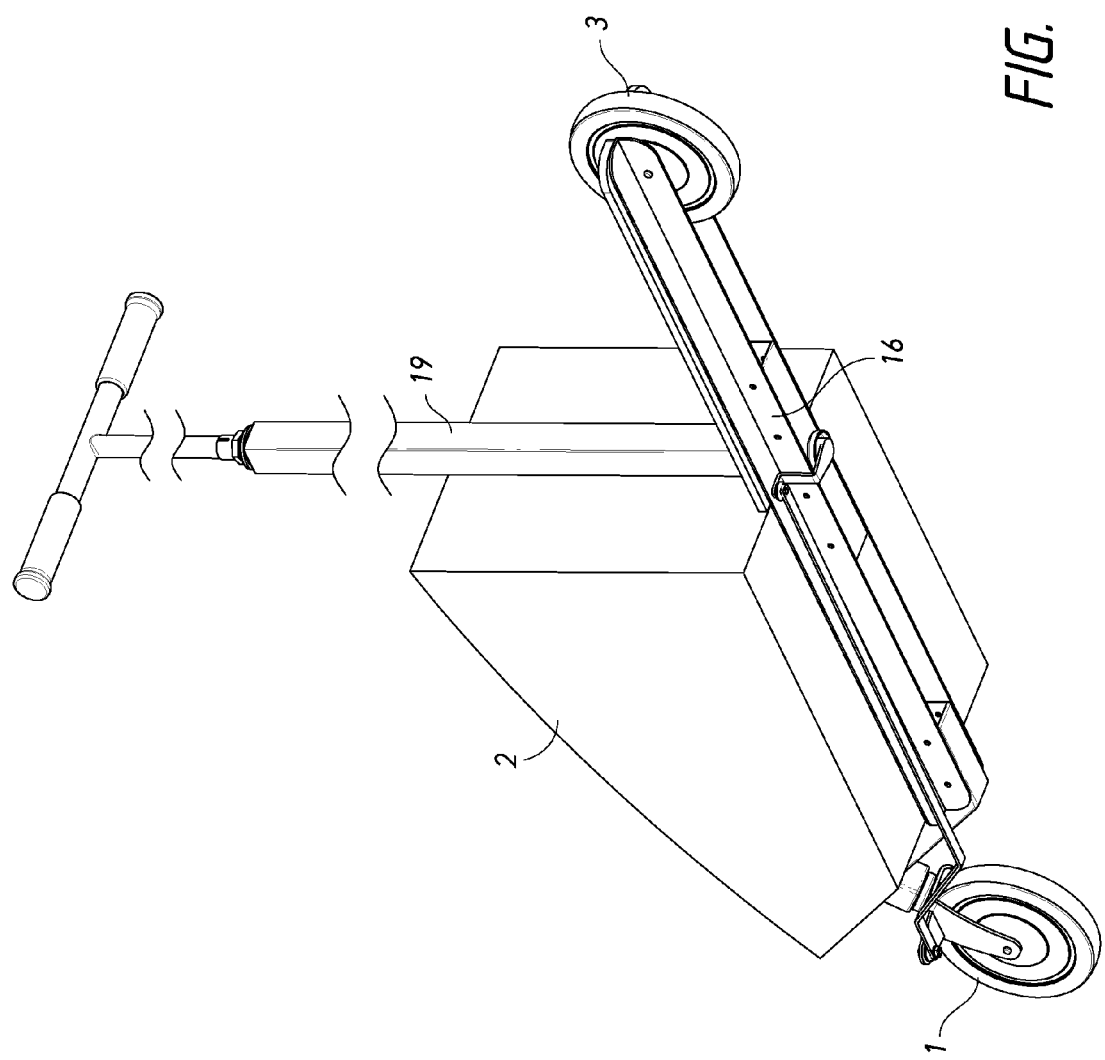

The scooter comprises a front riding wheel 1, a cargo box 2, a rear riding wheel 3, a deck 4, handlebars 10, and a linked steering system that links the handle bars to the front riding wheel 1.

Referring to FIGS. 2A-2C, 11a, and 11b; the front riding wheel 1 is secured to a front steering bracket 17. The steering arm 14 rotates the front steering bracket 17. The linkage arm 13 is secured to the steering arm 14. In some embodiments the bracket 17 is forked and secures the axel on both sides. In other embodiments, the bracket 17 only secures one side of the axel. In some embodiments, the front steering bracket 17 and the steering arm 14 are integral, and in other embodiments, they are attached together by known means.

Referring to FIGS. 5A-5F, the cargo box 2 can have many different designs. The corners can be rounded, squared, truncated or any combination thereof. The cargo box 2 is wider than the deck 4 and extends outward. Additionally, the cargo box 2 can have parking rails 5 located thereon or be integrated therewith. The parking rails 5 can be located near or wrap about lower exterior edges of the cargo box 2.

The cargo box 2, because it extends out further than the deck 4, helps to provide an easy means to park the scooter. When the scooter is leaned over, the front riding wheel 1, the rear riding wheel 3, and the long edge of the cargo box 2 from a stable tripod configuration. The lower edge of the cargo box 2 can also have an accommodating surface (e.g. a truncated corner) that will increase the surface area in contact with the ground when the scooter is leaned over. This will also increase the amount of lean the scooter can make when riding. When parking rails 5 are used, they can conform to the shape of the lower exterior edges. In other embodiments, the parking rails 5 will be located on the bottom of the cargo box 2 and will make contact with the ground before the cargo box 2 when the scooter is leaned over.

The parking rails 5 can be made of metal, wood, plastic, ceramic, composites, or a combination thereof. In some embodiments, the parking rails 5 comprise high density plastic. In other embodiments, they comprise of metal plates <Here we are trying to define specific embodiments . . . the sentence above is to state it can be various materials>.

The cargo box 2 can be made of metal, wood, plastic, ceramic, fabric, composites, or any combination thereof. In some embodiments, the cargo box 2 is made of high density plastic. In some embodiments the cargo box 2 is made using composite layups, vacuum formed plastics, rotational molded plastics, or other plastic forming methods. In other embodiments, the cargo box 2 actually has parking rails 5 that are integral with and/or embedded in the cargo box 2.

In some embodiments, the lower exterior edges are lined with any number of wheels and/or bearings in a way that allows the cargo box 2 to be leaned onto its side and protect the box if the scooter is angled deeply. In other embodiments, a single armed or double armed kick stand can be mounted onto the frame 16 or cargo box 2 for use when parking in a fashion similar to a motorcycle.

Figure 11A:
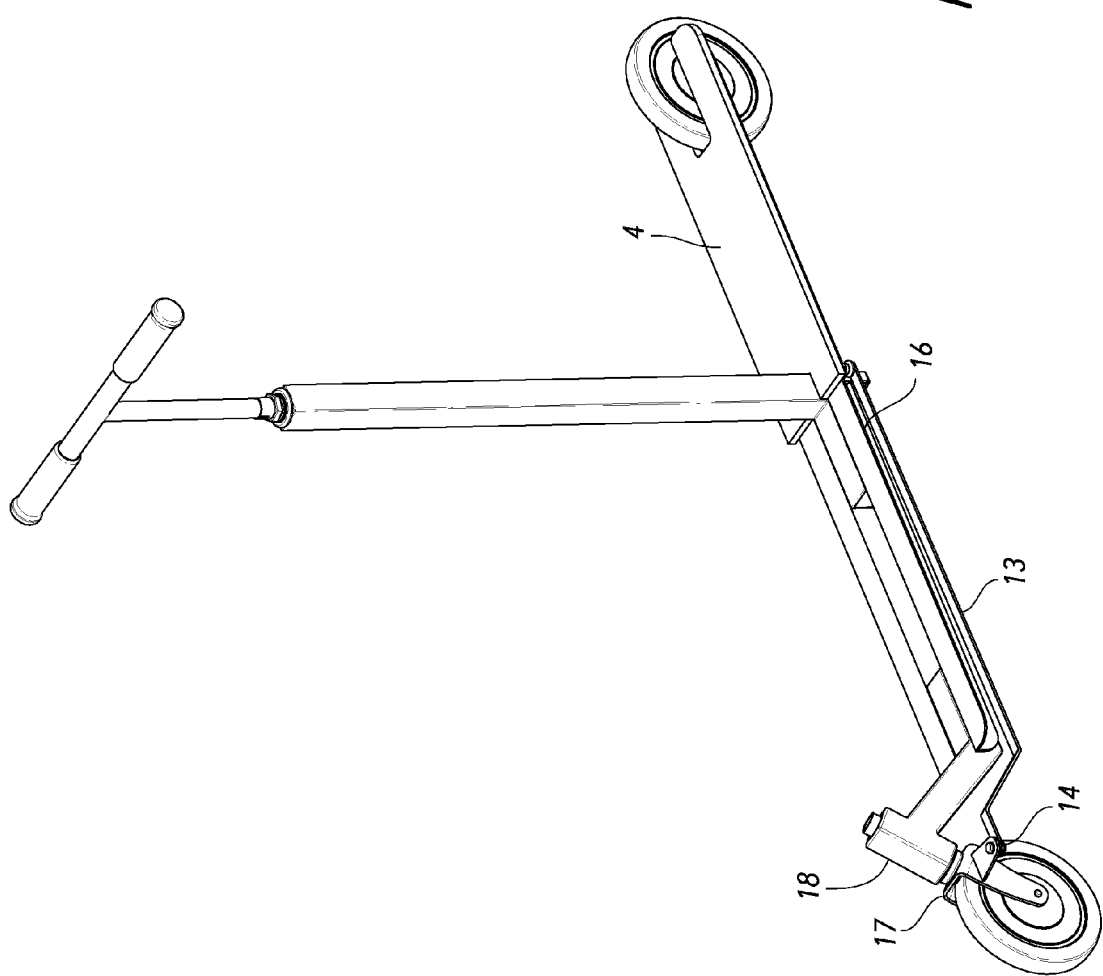
FIGS. 11A-11C: shows several views of an embodiment without a cargo box.
Figure 11B:
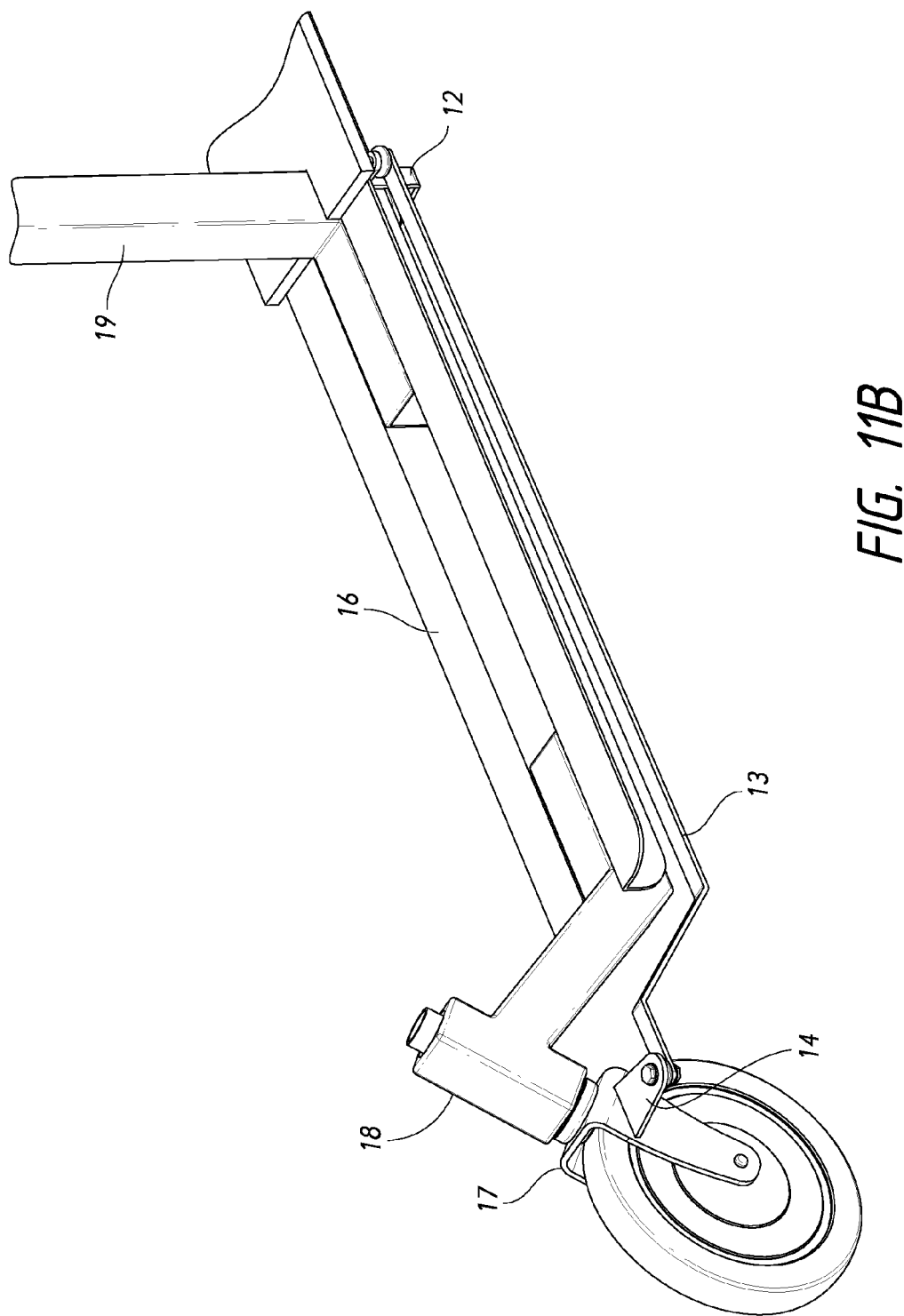
Figure 11C:
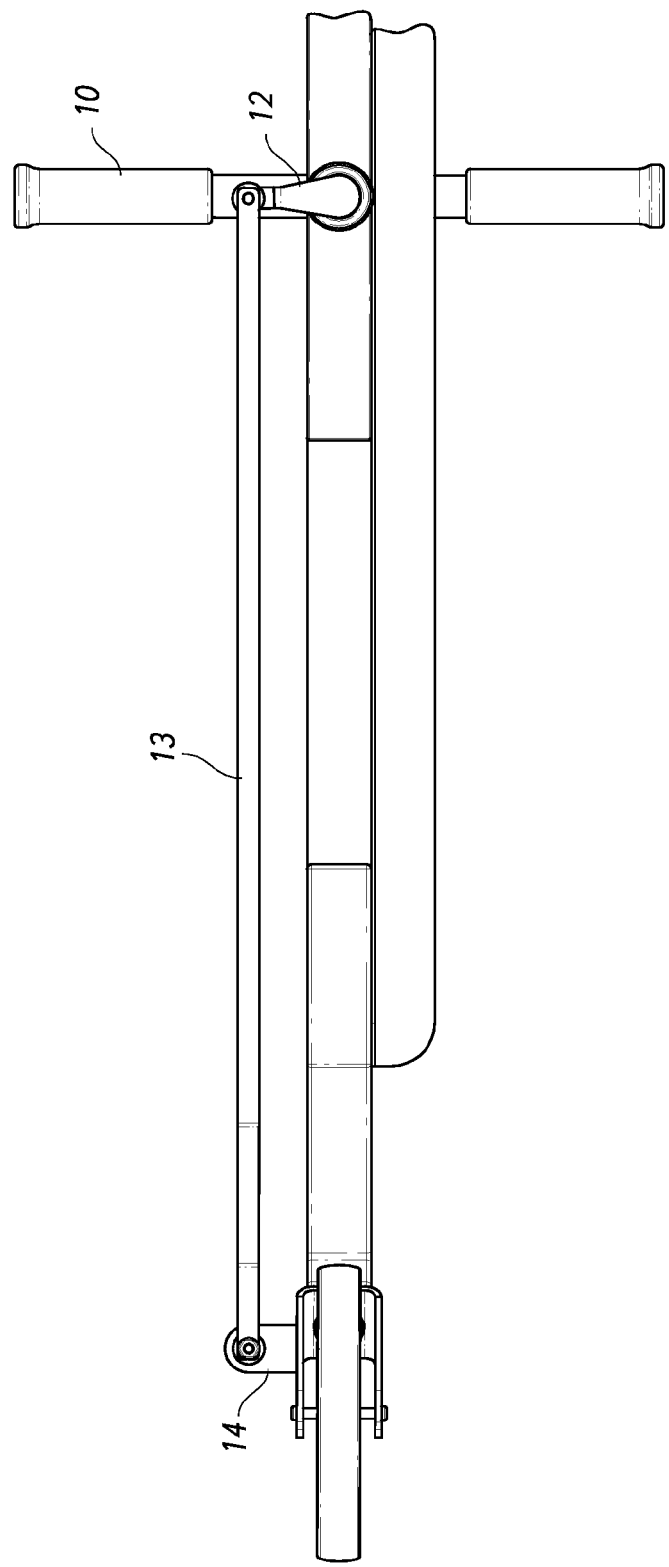

Referring to FIGS. 11A-11C, the steering assembly can be a parallelogram with joints that allow the sides to rotate. The scooter is steered by the handlebars 10. The rotation of the handlebars 10 is transferred along the steering column 11, which can be located in a steering column housing 19. The steering column 11 transfers the rotation to the rear steering arm 12. The rear steering arm 12 then transfers the rotation to the linkage arm 13. However due to the configuration of the system, the rotational movement is transformed into linear movement such that the linkage arm 13 is moved back and forth. The linear movement of the linkage arm 13 is then transferred to the steering arm 14. The linear movement of the linkage arm 13 is transformed back into rotational movement to turn the front riding wheel 1.

In some embodiments, one or more absorbers 15 are employed in the steering system. As can be seen in FIG. 2, an absorber 15 can be located between the linkage arm 13 and the steering arm 14. There can also be an absorber 15 located between the rear steering arm 12 and the linkage arm 13. The absorber 15 is made of a material that can absorb vibration. In some embodiments, the absorbers 15 can be made of a flexible elastomer such as urethane or rubber.

When one or more absorbers 15 are used, progressive steering resistance can be created and will provide more resistance with shaper turns. As the handlebars 10 are turned a torsion force is exerted on the linkage arm 13. The linkage arm 13 is allowed to twist axially down the length of the arm. While turning the scooter using the handlebars 10, the linkage arm 13 begins to twist and the one or more absorbers 15 are compressed by this twisting force. As the user turns the handlebars 10 tighter, more torsion force is exerted on the linkage arm 13 and more compressive force is then exerted on the one or more absorbers 15. In some embodiments, a bolt is inserted through corresponding holes in the steering arm 14 and the linkage arm 13, and the bolt will allow for relative movement between the steering arm 14 and the linkage arm 13. The compression of the absorber(s) 15 is what provides progressive resistance to steering forces exerted on the handlebars 10. As can be seen in FIGS. 12A-12C, the forces acting on the first bushing are shown. If a rear bushing is used, the forces applied would be opposite for the rear bushing. This is what gives the user progressive feedback and smoother steering response as they make turns. The tighter the turn they make with the scooter, the harder it becomes to turn the handlebars 10.

In one embodiment, the rear steering arm 12 is connected to the linkage arm 13 by a nut and bolt. The bolt runs through a hole in the rear steering arm 12 and a hole in the linkage arm 13. The other end of the linkage arm 13 is connected to the steering arm 14 by a nut and bolt. The bolt runs through the hole on the linkage arm 13, through a hole in a urethane absorber 15, the hole in the steering arm 14, and then to a lock nut fastener. The absorber 15 is located between the linkage arm 13 and the steering arm 14, with both the linkage arm 13 and the steering arm 14 allowed to rotate freely.

The rear steering arm 12 is secured to the steering column 11. In some embodiments, the rear steering arm 12 is welded to the steering column 11. In other embodiments, a fastener (e.g. a screw) is employed. The rear steering arm 12 extends around the bottom and up the side of the frame 16 to connect to the linkage arm 13. The frame 16 can serve as a natural stop for the over rotation of the handlebars 10. In some embodiments, one or more openings can be present in the frame 16 to allow for increased rotation of the handlebars 10.

The linkage arm 13 can be made from a tube or a planar material. Additionally, the linkage arm 13 can be bent or straight. When the linkage arm 13 is bent and/or made of an appropriate material, it can act as a spring. This configuration can serve two purposes. First, the bent shape gives the front riding wheel 1 clearance as it turns. Additionally, having the bent shape and/or an elastic material or structure, the linkage arm 13 can bend slightly as the user makes a turn. This bending gives the steering a dampened feel versus a linkage arm 13 that is straight and/or made of a more rigid material or structure.

The linked steering system allows the user to steer the front riding wheel 1 of the scooter while standing towards the rear of the scooter. Furthermore, the linked steering system has a unique dampening mechanism, which maintains high-speed stability, minimizes steering vibration (e.g. steering wobbles), and provides progressively higher steering resistance the more the user turns the front riding wheel 1. Overall, the linked steering system allows for more space for the cargo box 2 between the front riding wheel 1 and the rider, dampen steering vibration, and provide progressive steering resistance, which results in a safe, convenient, and stable ride. In some embodiments, techniques such as cables, wires, chains, gears, or servo control motors that form a connection between the handlebars 10 and the front riding wheel 1 can be used.

Refereeing to FIGS. 3A-4C, the attributes of two riding wheeled front steering design and the stability of a single riding wheeled design are shown. It has been found that by having a single line of riding wheels, even with large cargo loads, is safer than the multiple lines of riding wheels of the prior art. When making turns, the multiple riding wheel lines are not able to lean and if the moment of inertia is overcome, a full tipping of the scooter can be eminent. However, by having riding wheels aligned, when making moderate speed turns the scooter can counteract outward centrifugal forces and avoid tipping by leaning into the turn. Additionally, when on an unlevel service, the multiple wheel lined scooter must ride at the angle of the surface. However, by having only riding wheels that are aligned, the scooter 'leans' as compared to the surface, but can be level as compared to the vertical.

Figure 6:
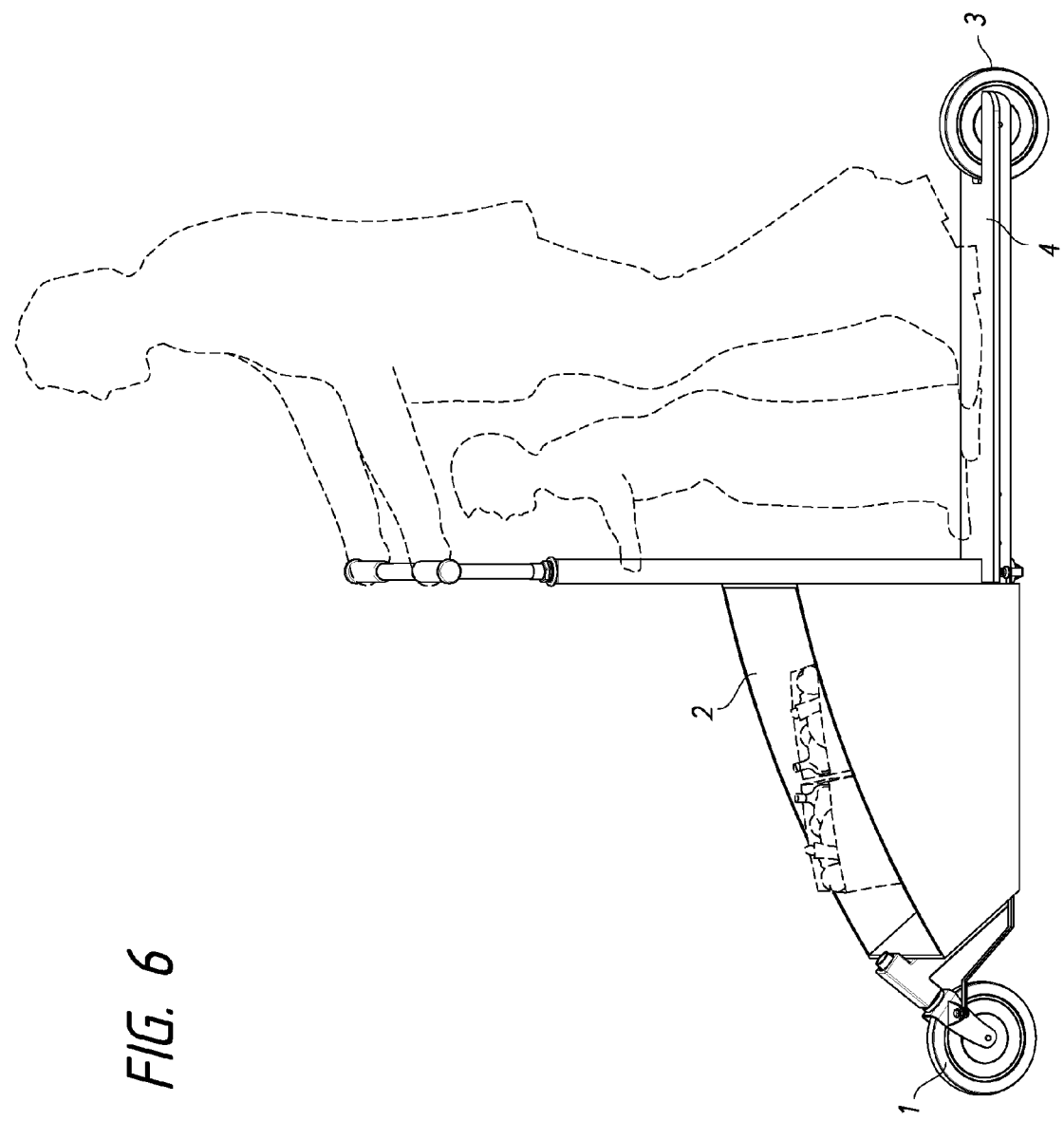
FIGS. 6 & 7: shows different uses of embodiments of the scooter.
Figure 7:
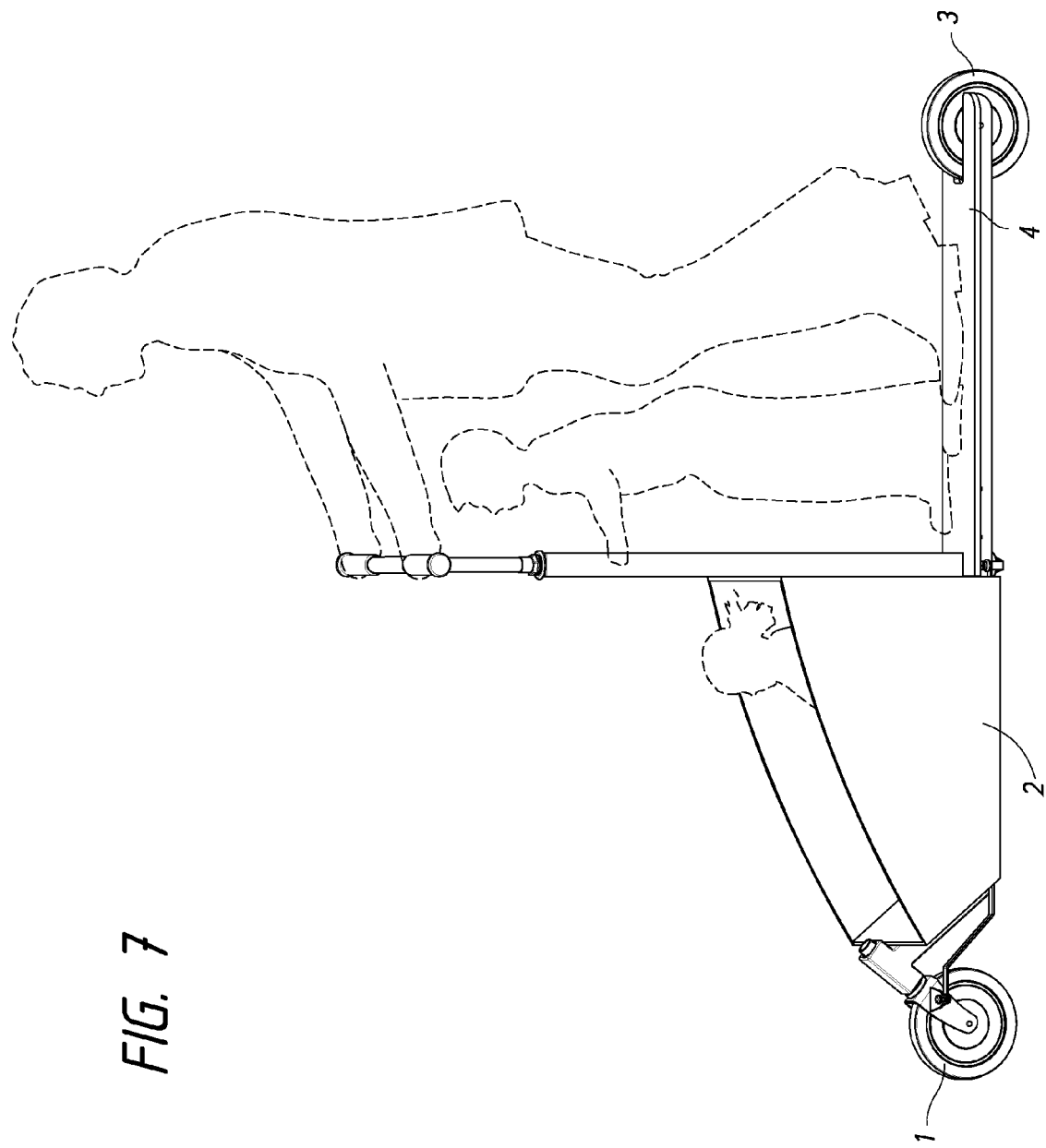

As can been seen in FIGS. 6 and 7, the deck 4 can be long enough to allow more than one user to ride at a time. Additionally, a user can ride in the cargo box 2.

Figure 8:
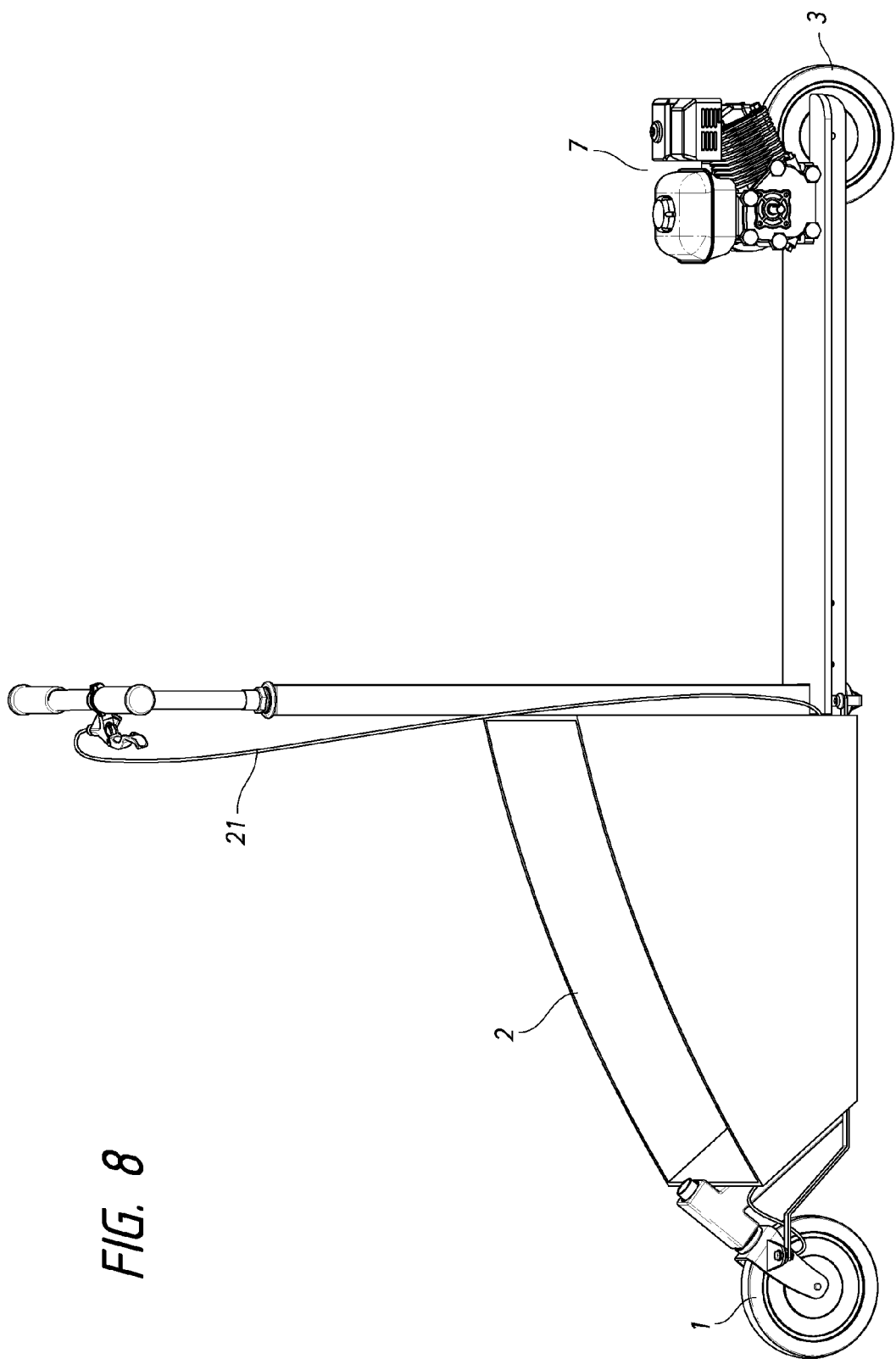
FIG. 8: shows an embodiment of a scooter with gas combustion motor.

As can been seen in FIG. 8, a gas motor 7 can be used to propel the scooter. These motors and transmission systems are known in the art. What is also shown is that in some embodiments a brake is located on the front riding wheel 1 and a hand actuator is located on the handlebars 10.

Figure 9A:
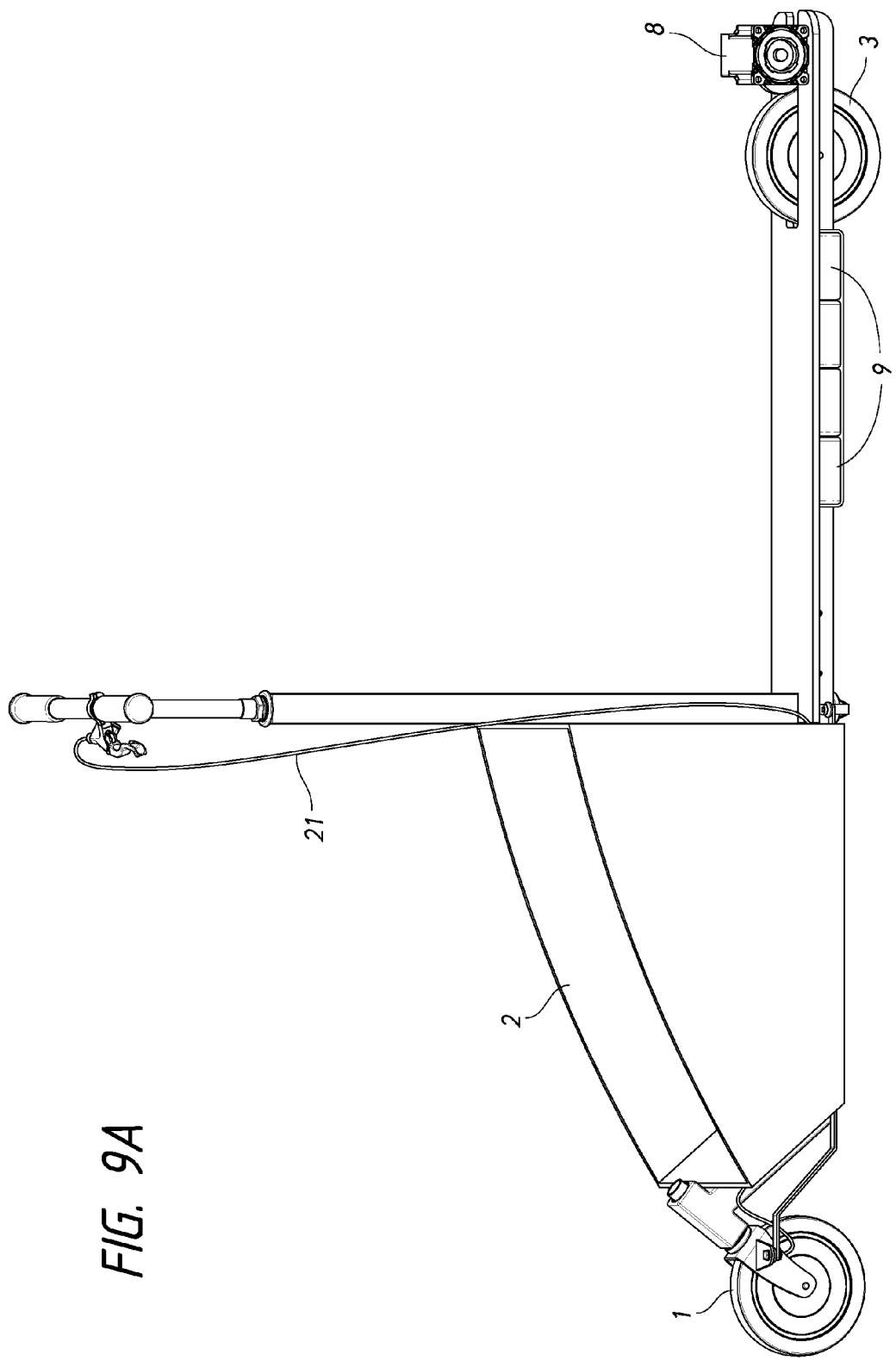
FIGS. 9A & 9B: shows an embodiment of a scooter with electric motor.
Figure 9B:
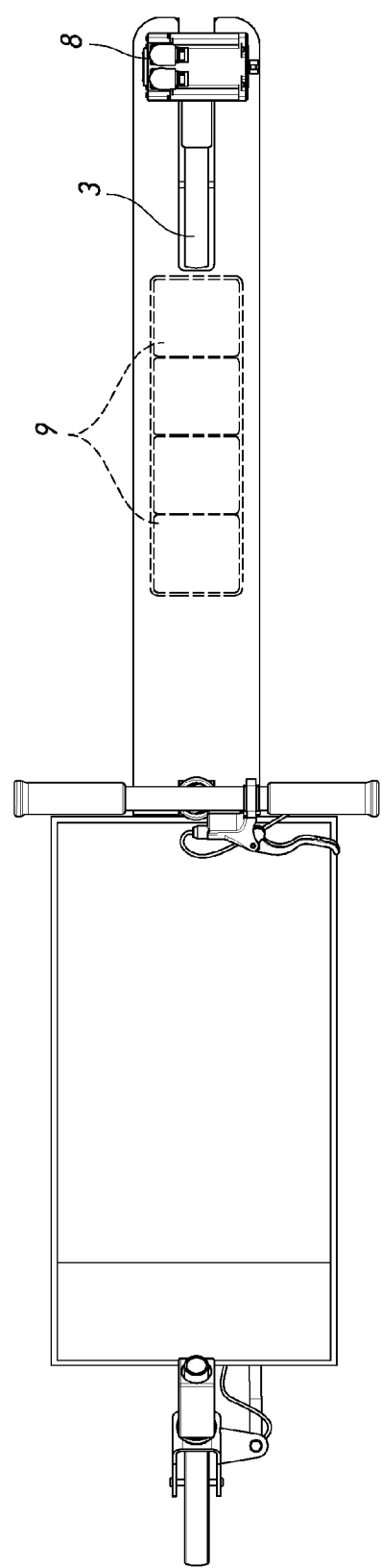
Figure 10C:
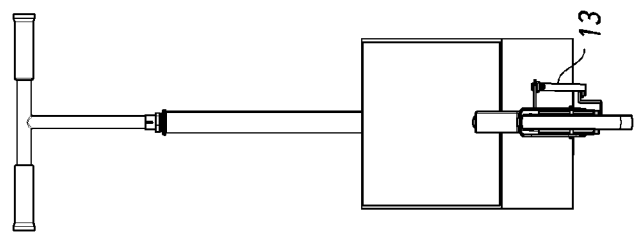
FIGS. 10A-10C: shows several views of an embodiment of a scooter.
Figure 10A:
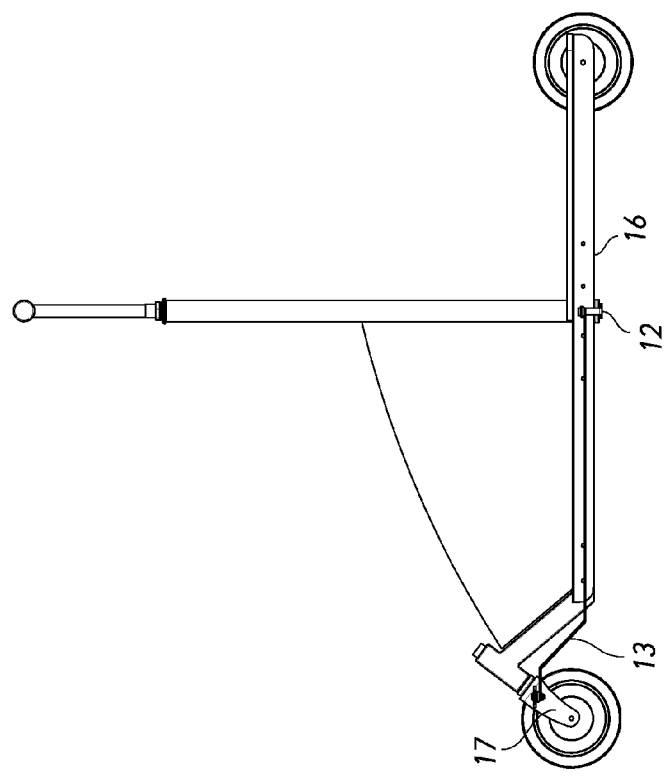
Figure 10B:
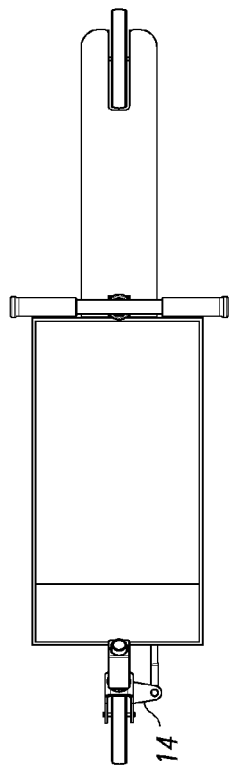

As can be seen in FIGS. 9A and 9B, an electric motor 8 and one or more batteries 9 can be employed. In some embodiments, the one or more batteries 9 can be rechargeable and the system can have a means to charge via standard wall outlets.

Figure 13A:
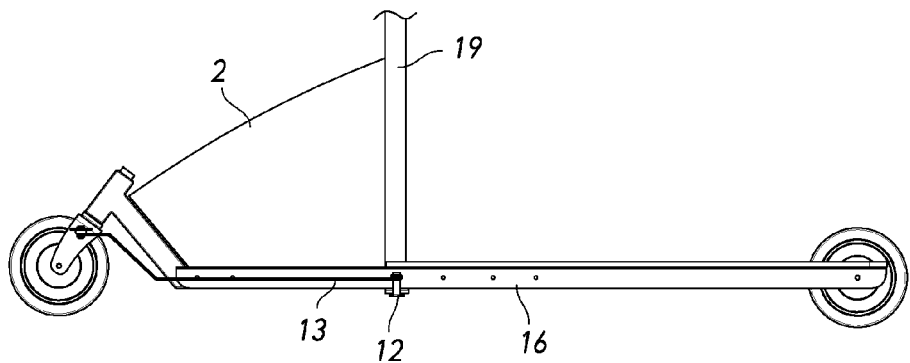
FIGS. 13A-13C: shows different locations of the steering column housing and different cargo boxes.
Figure 13B:
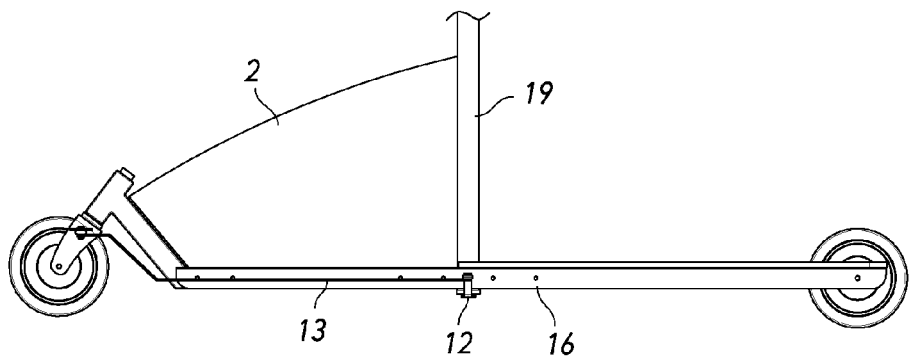
Figure 13C:
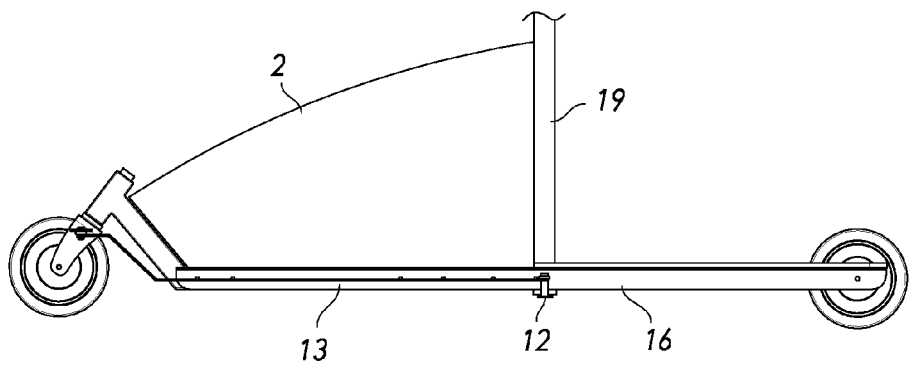
Figure 14:
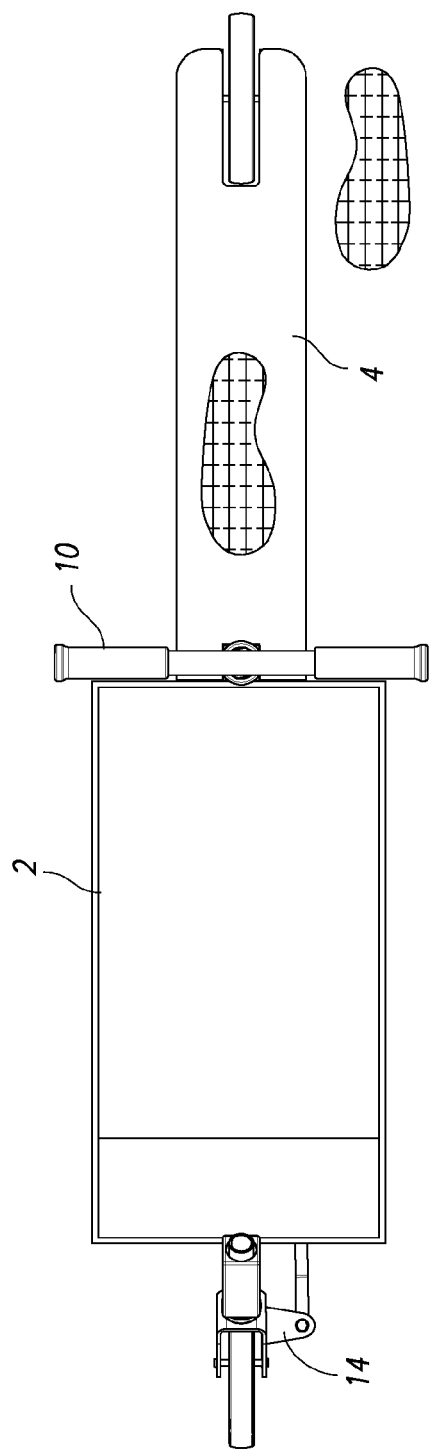
FIG. 14: shows, in shadow, a user's feet in relation to one embodiment of the scooter.

Referring to FIG. 13A-13C, different embodiments will have varying locations of the steering column 11. Additionally the steering column's 11 location along the frame is adjustable.

Referring to FIG. 15, an embodiment with a foldable deck 4 is shown. A rest 20 is provided on both sides, so that when the deck 4 is folded, the rest 20 will abut the ground. The rest can be either a stationary part or a rotatable element, e.g. a wheel or a ball. This will serve to protect the frame 16 when the foldable deck 4 is in its upright position.

In some embodiments, the frame 16 is made from two L-shaped extruded aluminum beams. The front neck assembly 18, cargo box 2, steering column housing 19, deck 4, and rear riding wheel 3 are attached to the frame 16 by standard ¼"×20 bolts, followed by the linkage arm 13, which is bolted to the rear steering arm 12 and steering arm 14. The steering column housing 19 and front neck assembly 18 are made from 1½" square welded aluminum tubing and standard bicycle neck parts. The front and rear riding wheels 1, 3 are large diameter polyurethane scooter wheels. The cargo box 2 is made of wood. In other embodiments aluminum, steel, wood, fabric, molded composites, and/or molded plastics may be used.

One principal feature is the arrangement of the steering, cargo box 2, and user. The front riding wheel 1 is at the very front of the scooter, followed by the cargo box 2. By this arrangement, the user rides behind the cargo box 2, while steering the front riding wheel 1, which is in front of the cargo box 2. The cargo box 2 can be used to carry any contents such as groceries, children, pets, books, tools, etc. One advantage of having the cargo in front of the user is that it allows the user to keep an eye on the cargo as they ride. Also, it keeps the area behind the user obstruction free so that they can push freely with their feet.

The leaning ability allows the scooter to be parked extremely quickly and with minimal effort, which is very convenient for trips with multiple stops such as when making postal deliveries or working in a warehouse. Also, the lean parking keeps the scooter from rolling away or falling over when unattended, which is another advantage when making frequent stops.

In some embodiments the scooter is modular and customizable. It is possible to quickly and easily swap out major parts to either make improvements or customize the design for a specific use. For example the riding wheels can easily be replaced by wheels of different colors, materials, diameters, and tread patterns. Also in the design, a larger cargo box 2 can be attached easily by bolting the steering column housing 19 further back towards the rear riding wheel 3 and then attaching a longer steering linkage arm 13, as seen in FIGS. 13A-13C. Another quick modification is to power the scooter by bolting on an electric or gas powered motor. Furthermore, the design can be modified to be foldable, as seen in FIG. 15, or in other embodiments designed to have a foldable cargo box 2.

The scooter has low center of gravity. In some embodiments, small diameter riding wheels are employed, and the center of gravity on the scooter is very low to the ground. Further lowering the center of gravity, the wide base of the cargo box 2 allows for more weight to be distributed along the floor of the cargo box 2. Therefore, the scooter is not prone to falling over like a bicycle at low speeds or when parked. Essentially, the scooter's low center of gravity gives it slow speed stability and the ability to be parked without a kickstand by simply leaning it onto the edge of its cargo box 2. Furthermore, by being able to lean while riding through turns or on unlevel surfaces, the scooter is extremely tip resistant and stable. This added stability results in a very safe ride for the user and contents of the cargo box 2.

Those skilled in the art will now see that certain modifications can be made to the apparatus and methods herein disclosed with respect to the illustrated embodiments, without departing from the spirit of the instant invention. And while the invention has been described above with respect to several embodiments, any element and/or step described in reference to any particular embodiment is hereby disclosed to be associated with any other embodiment of the invention. It is understood that the invention is adapted to numerous rearrangements, modifications, and alterations, and all such arrangements, modifications, and alterations are intended to be within the scope of the invention.

The invention claimed is:

1. An apparatus comprising:
    at least one front riding wheel and at least one rear riding wheel,
    a deck;
    a cargo box comprising a floor; and
    a steering column;
    wherein the floor is located between the at least one front riding wheel and the steering column, the deck is located between the at least one rear riding wheel and the cargo box, and all of the riding wheels are aligned with each other.

2. The apparatus of claim 1, further comprising:
    a linkage arm in communication with the steering column and the at least one front riding wheel.

3. The apparatus of claim 2, wherein the linkage arm is formed from a planar material and is bent.

4. The apparatus of claim 2, further comprising:
    a steering arm;
    a rear steering arm;
    wherein the linkage arm is connected to the steering arm and the rear steering arm, and the rear steering arm is located below the deck.

5. The apparatus of claim 4, further comprising at least one absorber located between the linkage arm and the steering arm or the linkage arm and the rear steering arm.

6. The apparatus of claim 1, further comprising a frame and a steering column housing; wherein the steering column housing houses the steering column and is secured to the frame, and there is more than one location that the steering column housing can be secured to the frame; and the floor is connected to the frame.

7. The apparatus of claim 1, wherein the deck is foldable.

8. The apparatus of claim 1, wherein the cargo box is collapsible.

9. The apparatus of claim 1, further comprising a motor, wherein the motor is a gas powered motor or an electric motor; and the motor is in communication with the at least one front riding wheel, at least one rear riding wheel, or both at least one front riding wheel and at least one rear riding wheel.

10. The apparatus of claim 1, further comprising at least two parking rails located on the cargo box.

11. The apparatus of claim 1, wherein the cargo box has at least one corner having a shape, and the shape is selected from group consisting of rounded, squared, truncated or any combination thereof.

12. The apparatus of claim 11, further comprising at least one parking rail located adjacent to the at least one corner, on the at least one corner, about the corner, or a combination thereof.

13. An apparatus comprising:
only a single front riding wheel and only a single rear riding wheel;
a deck;
a cargo box comprising a floor; and
a steering column;
wherein the floor is located between the single front riding wheel and the steering column, the deck is located between the single rear riding wheel and the cargo box, and all of the wheels are aligned with each other.

14. The apparatus of claim 13, further comprising:
a linkage arm in communication with the steering column and the single front riding wheel.

15. The apparatus of claim 14, wherein the linkage arm is formed from a planar material and is bent.

16. The apparatus of claim 14, further comprising:
a steering arm;
a rear steering arm;
wherein the linkage arm is connected to the steering arm and the rear steering arm, and the rear steering arm is located below the deck.

17. The apparatus of claim 16, further comprising at least one absorber located between the linkage arm and the steering arm or the linkage arm and the rear steering arm.

18. The apparatus of claim 13, further comprising a frame and a steering column housing; wherein the steering column housing houses the steering column and is secured to the frame, and there is more than one location that the steering column housing can be secured to the frame; and the floor is connected to the frame.

19. The apparatus of claim 13, wherein the deck is foldable.

20. The apparatus of claim 13, wherein the cargo box is collapsible.

21. The apparatus of claim 13, further comprising a motor, wherein the motor is a gas powered motor or an electric motor; and the motor is in communication with the single front riding wheel, the single rear riding wheel, or both the single front riding wheel and the single rear riding wheel.

22. The apparatus of claim 13, further comprising at least two parking rails located on the cargo box.

23. The apparatus of claim 1, wherein the cargo box has at least one corner having a shape, and the shape is selected from group consisting of rounded, squared, truncated or any combination thereof.

24. The apparatus of claim 23, further comprising at least one parking rail located adjacent to the at least one corner, on the at least one corner, about the corner, or a combination thereof.

* * * * *